United States Patent

[11] 3,582,661

| [72] | Inventor | Hermanus Stephanus Josephus Pijls<br>Emmasingel, Eindhoven, Netherlands |
|---|---|---|
| [21] | Appl. No. | 761,431 |
| [22] | Filed | Sept. 23, 1968 |
| [45] | Patented | June 1, 1971 |
| [73] | Assignee | U.S. Philips Corporaton<br>New York, N.Y. |
| [32] | Priority | Sept. 15, 1967 |
| [33] | | Netherlands |
| [31] | | 6713063 |

[54] PHOTOELECTRIC YARN MEASURER HAVING REFERENCE CHANNEL
9 Claims, 3 Drawing Figs.

[52] U.S. Cl. .................................................. 250/219,
250/205, 356/199, 356/238
[51] Int. Cl. .......................................................... G01n 21/30
[50] Field of Search............................................ 250/219 S,
219 Wd, 219 Lth, 219 DF, 219 Web, 219 F, 219
Th, 205, 220; 356/93, 199, 238, 159; 209/111.7,
111.6

[56] References Cited
UNITED STATES PATENTS
2,895,373  7/1959  Eyraud........................  250/219

| 3,215,843 | 11/1965 | Neil........................... | 250/205 |
| 3,264,922 | 8/1966 | Peyer......................... | 356/159 |
| 3,340,400 | 9/1967 | Quittner..................... | 250/219 |
| 3,345,907 | 10/1967 | Wada......................... | 356/93 |

Primary Examiner—James W. Lawrence
Assistant Examiner—Martin Abramson
Attorney—Frank R. Trifari ABSTRACT: A yarn cleaner for measuring the absolute yarn diameter includes a light source optically coupled to first and second photocells arranged in a measuring channel through which the yarn passes and a reference channel without yarn, respectively. The respective yarn and reference signals from the first and second photocells are summed together to derive a signal proportional to the absolute yarn diameter. The latter signal is applied to one input of an amplitude discriminator and a threshold voltage is applied to a second input thereof. A control loop is formed is formed by a comparison circuit and a source of variable voltage in cascade between the second photocell and the light source. An external source of adjustable reference voltage is applied to one input of the comparison circuit whereby the control loop operates to match the second photocell reference signal to the external reference voltage.

PATENTED JUN 1 1971 3,582,661

INVENTOR.
HERMANUS S.J.PIJLS
BY

*Frank R. Trifari*
AGENT

PHOTOELECTRIC YARN MEASURER HAVING REFERENCE CHANNEL

The present invention relates to a yarn cleaner for measuring the absolute diameter or the absolute mass of a yarn. This apparatus generally comprises a measuring channel through which the yarn can be passed and which is provided with means for converting the diameter or the mass per unit of length of the yarn into an electrical signal, termed the yarn signal, and further comprising an amplitude discriminator. Such yarn cleaners are known (Dutch Patent Application Nr. 6,606,604). In such devices the yarn whose undesirable diameter or mass variations have to be assessed and eliminated is passed through a measuring channel. The latter may be an optical, photoelectric or capacitive measuring channel. The yarn signal is applied in the known device to an amplitude discriminator having a threshold value automatically adjustable between two predetermined values in accordance with the condition of the yarn (standstill or travel). It is thus possible to perform a correct measurement both at the standstill condition of the yarn (when the yarn is inserted into the measuring channel) and during the travel of the yarn.

Such yarn cleaners have a disadvantage in that owing to the predetermined threshold values of the amplitude discriminator, variations not produced by the yarn must not occur in the measuring channel. If such usually slow variations do occur due to external effects, for example, temperature fluctuations and ageing of the elements, the yarn signal varies in the same sense so that it is no longer an absolute measure of the diameter or the mass of the yarn. Other yarn cleaners are known (see, for example, British Patent Specification 716,370) in which it is not the absolute diameter or mass of a yarn which is measured but only the deviations of the diameter or the mass of said yarn from a reference yarn arranged in a reference cell supplied from the same source as the measuring cell. Slow variations occur equally in the measuring cell and in the reference cell so that they do not form a source of trouble. A great disadvantage is, however, that when the yarn size is varied, the reference yarn of all the yarn cleaners has to be replaced by a corresponding reference yarn. When, in the known device, the yarn in the reference cell serves as a reference to itself, difficulties arise with respect to the permissible lengths of the deviations, since structurally the two cells must not be too far away from each other.

The invention relates only to yarn cleaners for performing absolute measurements since this is more desirable in practice. No special precautions have to be taken to solve the problem involved in the insertion of a yarn in a relatively measuring cleaner, in which a diameter deviation (= increase) of the size of the yarn diameter occurs. A further advantage of an absolute measurement is that the measuring results are independent of the direction of movement of the yarn. A large thickened portion between a thin and a thick length of yarn is measured to the same extent whether the thick part or the thin part precedes the thickened portion.

However, in order to carry out a satisfactory absolute measurement, it is necessary that yarn cleaners for absolute measurements do not exhibit the aforesaid disadvantage of the known yarn cleaner for absolute measurements.

According to the invention the yarn cleaner for measuring the absolute yarn diameter is characterized in that it comprises a reference channel without yarn, fed from the same variable source as the measuring channel, for producing an electric reference signal, said channel together with the variable supply source being included in a control loop for equalizing the reference signal to an external absolute reference signal. The yarn cleaner further comprises a summation device having inputs for the yarn signal and/or the reference signal and provides at its output a signal which is proportional to the absolute diameter or the absolute mass per unit of length of the yarn. The latter signal is applied to the amplitude discriminator.

It is thus ensured that the signal at the output of the summation device always provides an indication of the absolute diameter or mass per unit of length of the yarn.

The solution according to the invention provides further possibilities of use, for example, the adaptation of the yarn cleaner to yarns to be measured having highly different diameters or masses (large range of yarn sizes) can be carried out in a very simple manner.

Other possibilities will be explained in the following description of the invention taken with reference to accompanying drawing, in which.

Figures 1, 2:
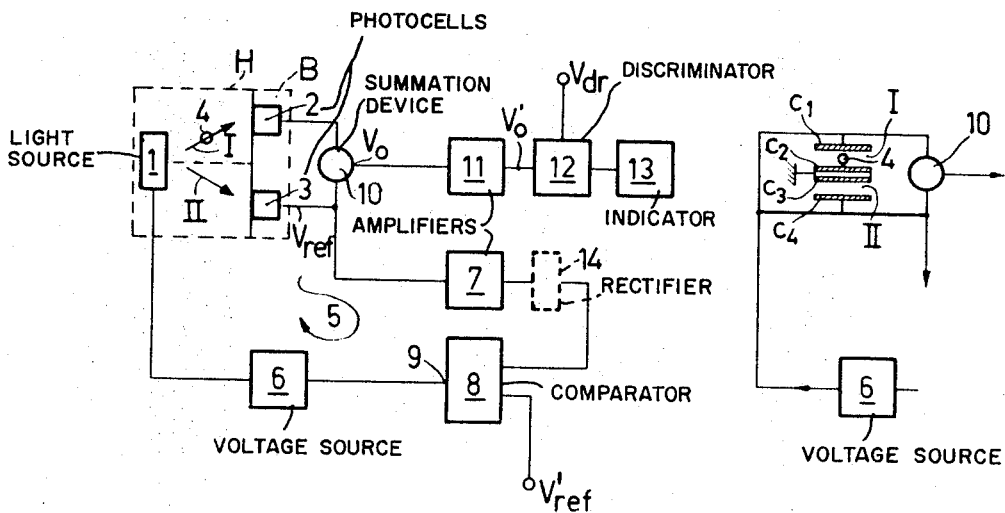
FIG. 1 shows diagrammatically a photoelectric yarn cleaner according to the invention.
FIG. 2 shows schematically a capacitive yarn cleaner according to the invention.

Referring to FIG. 1, reference character I designates the measuring channel with a variable light source 1 and a photoelectric cell 2. The measuring channel I contains a yarn 4. Reference character II designates the reference channel having the same variable light source 1 and a photoelectric cell 3. The reference channel II is included in a control-loop 5. The control-loop 5 includes furthermore the variable light source 1, which is fed from a variable voltage source 6. The control-loop 5 comprises furthermore an amplifier 7 and a comparison member 8. To the comparison member 8 is also fed an absolute reference signal $V'_{ref}$. From the output 9 of the comparison member 8 the voltage source 6 is controlled and in turn the latter controls the light source 1. The signals of the photocells 2 and 3 are applied to the summation device 10. The difference between the absolute value of the two signals is applied, subsequent to amplification in an amplifier 11, to an amplitude discriminator 12, to which a threshold voltage $V_{dr}$ is applied. The output of said discriminator is connected to an indicator and/or a yarn cutting member 13.

The device operates as follows:

Independently of the yarn 4 in the measuring channel, the light source 1 is controlled by means of the voltage source 6 in the control-loop 5, including the reference channel II, so that the voltage $V_{ref}$ of the photocell 3, the reference signal of the reference channel II subsequent to amplification in the amplifier 7, is always equal to the absolute reference voltage $V'_{ref}$ at the input of the comparison member 8. In this way variations in the reference channel II and the voltage source 6 are eliminated. In practice the measuring channel I and the reference channel II are arranged in the same envelope H so that the photocells 2 and 3, which are as much identical as possible, may be built into a common block B.

Variations due to temperature fluctuations and ageing of the light source, photocells and so on may therefore be considered to be the same in the two channels I and II so that by means of said control these variations are also eliminated in the measuring channel. Thus an absolute measurement in the measuring channel I can be carried out without the need for further means. When no yarn 4 is present, the quantity of light in the measuring channel I or in the reference channel can be adjusted simply so that the signal of the photocell 2 of the measuring channel I is equal to the reference signal of the photocell 3 of the reference channel II. This is assessed in the summation device 10, which is capable of determining the absolute difference between the two signals. After this adjustment the presence of a yarn 4 in the measuring channel I will produce a signal $V_o$ at the output of the device 10 which is always a measure of the absolute value of the diameter of the yarn 4. Subsequent to amplification in the amplifier 11, this signal $V_o$ is compared in the discriminator 12 with the adjusted threshold voltage $V_{dr}$. This threshold voltage is equal to the amplified voltage $V'_o$ which corresponds to the maximum permissible diameter of the yarn 4. If $V'_o$ exceeds $V_{dr}$, the indicator and/or the cutting device 13 becomes operative.

A second threshold may be chosen for the minimum permissible yarn diameter. When the yarn cleaner described has to clean yarns of different average diameters (different yarn sizes), only the voltage $V_{dr}$ has to be adjusted. This may be performed simultaneously for a great number of yarn cleaners via a common conductor.

However, this has the disadvantage that, when highly different yarns in a wide range of diameters, for example, from 80 μm to 0.5 mm., have to be cleaned, the amplifier 11 and the discriminator 12 of the cleaner have to be controllable over a wide range, that is to say both over the range of yarn sizes and over a large dynamic range for the highly different yarn diameters. For this purpose the yarn cleaner according to the invention permits of using the absolute reference voltage $V'_{ref}$ for adjusting the yarn size. The controllability of the loop 5 then has to correspond to $V'_{ref}$, whereas the controllability of the amplifier 11 and of the discriminator 12 has to cover only the dynamic range of the diameter variations of the yarns. The absolute reference voltage $V'_{ref}$ is adjustable so that with each yarn size the light intensity is adjusted to a value, which corresponds to the nominal yarn diameter, such that the voltage $V'_o$ at the output of the amplifier 11 is always the same, for example, 2 volts $V_{dr}$ has then to be chosen higher or lower than $V'_o$ to the extent required by the maximum and minimum permissible yarn diameters. The voltage $V_{dr}$ thus forms the sensitive adjustment for the device.

In order to carry out the absolute measurement of the yarn diameter described above without the use of direct-current amplifiers, which hardly permit or do not permit of obtaining the desired stability, the device may be constructed for alternating-current operation. The voltage source 6 may, for example, be a multivibrator controlled by the member 8 for feeding the light source 1. The pulsatory light produces alternating voltages in the photocells 2 and 3, which can be readily amplified. After the amplifier 7, the reference voltage $V_{ref}$ may be rectified in a rectifier 14. Similarly, after the alternating-current amplifier 11 the yarn signal for the discriminator 12 may first be rectified.

FIG. 2 shows schematically a capacitive measuring channel I and a reference channel II used in a capacitive yarn cleaner according to the invention. The capacitor plates $C_1$ and $C_2$ form the measuring channel I, which is fed from the variable current source 6. The capacitor plates $C_3$ and $C_4$ form the reference channel II, which is also fed from the source 6. The voltage of the measuring channel I, which is also determined by the yarn 4, and the reference voltage of the reference channel II are further processed in the same manner as in the device shown in FIG. 1.

Figure 3:
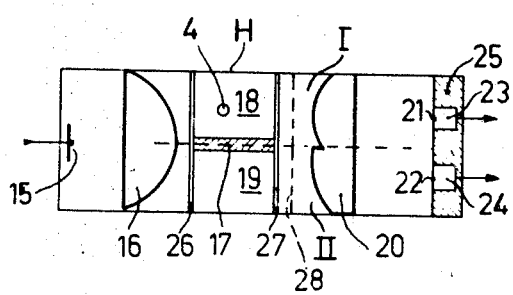
FIG. 3 shows a practical embodiment of the measuring and reference channel of the photoelectric yarn cleaner of FIG. 1.

FIG. 3 shows a practical embodiment of a pickup head for the photoelectric yarn cleaner of FIG. 1.

Reference numeral 15 designates a substantially point-shaped light source, which may advantageously be a light-emitting semiconductor element, for example, a gallium-arsenide diode or the like. This kind of light source has the advantage that it can be switched on and off at a high rate by a pulsatory supply current so that pulsatory light is produced, in which case the yarn cleaner, as stated above, does not require direct-current amplifiers.

The light from the source 15 is converted by a lens 16 into a parallel light beam. The beam is divided by a light dividing member 17 into two portions. One portion passes through the yarn gap 18 of the measuring channel I and the other portion passes through a part 19 of the reference channel II, where no yarn is present. The two beam portions are then concentrated by a lens, for example, a composite lens 20 so that the light from the yarn gap 18 and the reference light from the part 19 have a focus 21 and 22, respectively. At the focal point photocells 23 and 24 respectively, are arranged. The disposition of the photocells 23 and 24 at the foci 21 and 22, respectively, has the advantage that the local difference in sensitivity of the photocells have no effect.

The photocells are embedded in a block 25 composed of a material that is a good thermal conductor so that substantially no temperature difference occurs between the two cells. The yarn gap 18 and the part 19 of the reference channel II may be bounded by plates 26 and 27 of transparent material.

The luminous field traversed in the yarn gap 18 by the yarn has to be arranged so that the same length of yarn, irrespective of its place in the yarn gap 18, produces the same signal at the photocell 23. This is achieved only partly by means of said parallel light beam emanating from the lens 16. The movements of the yarn in the direction of the measuring channel I (in the drawing from left to right and vice versa) no longer exert any influence.

When the yarn moves through the gap 18 from top to bottom and vice versa, the yarn signal will vary due to the variation in light intensity in said direction, that is to say in the direction transverse of the light beam. This may be avoided by disposing a mask 28 behind the measuring gap 18. This mask 28, which may be made with great accuracy by an etching technique, has an opening or a permeability to light such that the variation in light intensity of the beam is compensated. The mask 28 may be extended to the reference channel II where it also has an opening. In order to equalize the signals at the outputs of the photocells 23 and 24 in the absence of yarn in the gap 18, a greater or smaller quantity of light may be intercepted by having a control-screw penetrate into the reference channel to a greater or lesser extent. In order to minimize the effect of temperature fluctuations and to maintain a linear relationship between the quantity of light impinging on the photocells and their output signals, the photocells can be short circuited by a low-ohmic resistance so that the short circuit current of the photocells is employed. By determining the absolute difference between the signal values of the photocells in the summation device 10 of FIG. 1, the signal $V_o$ is produced which is proportional to the quantity of light intercepted by the yarn: yarn diameter $x$ gap length $x$ light intensity. By means of the constant signal of the reference channel II, equalized as stated above for a group of yarn cleaners, the difference signal $V_o$ of the device 10 is a constant factor times the absolute diameter of the yarn for all cleaners of the group.

It is thus required that the signal of the measuring channel without yarn should always be equal to the signal of the reference channel. This means that no dust or dirt must stick to the transparent window (plate 26) which closes the yarn gap. By choosing a correct gap width and by using an optimum aerodynamic gap it may be ensured that dust cannot be deposited and that the surfaces of the yarn gap are constantly cleaned by protruding fibers of the travelling yarn.

What we claim is:

1. A yarn cleaner for measuring the absolute diameter or the absolute mass of a yarn, comprising a variable energy supply source, a measuring channel coupled to the supply source through which the yarn can be passed and comprising means for converting the diameter or the mass per unit of length of the yarn into an electric yarn signal, and comprising furthermore an amplitude discriminator, a reference channel without yarn coupled to the same variable source as the measuring channel and including means for producing an electric reference signal, an external source of absolute reference signal, a control-loop including said variable source and said reference channel for equalizing the reference signal to the external absolute reference signal, a summation device having inputs for receiving the yarn signal and the reference signal and an output at which a signal proportional to the absolute diameter or the absolute mass per unit of length of the yarn appears, and means for applying the latter signal to the amplitude discriminator.

2. A yarn cleaner as claimed in claim 1 further comprising means for adjusting the amplitude of the external absolute reference signal in accordance with the size of the yarns to be tested.

3. A yarn cleaner as claimed in claim 1 wherein the variable energy supply source includes a source of voltage coupled to a point light source and a lens which converts the light from the light source into a parallel light beam, a light dividing member arranged to split up the parallel light beam into two portions, one portion being operative in a yarn gap of the measuring channel and the other in a part of the reference channel, a first photoelectric cell for developing said yarn signal and a second photoelectric cell for developing said reference signal, and one or more lenses arranged to focus said two portions of the light beam onto said first and second photoelectric cells, respectively.

4. A yarn cleaner as claimed in claim 3 further comprising a mask arranged behind the yarn gap.

5. A yarn cleaner as claimed in claim 3 wherein the point light source comprises a light emitting semiconductor element.

6. A yarn cleaner as claimed in claim 1 wherein the controllable supply source delivers a pulsatory voltage.

7. A yarn cleaner as claimed in claim 2 further comprising a source of adjustable threshold voltage coupled to a second input of said amplitude discriminator, said amplitude discriminator producing a control signal at its output whenever said proportional signal exceeds the adjusted value of the threshold voltage.

8. A yarn cleaner as claimed in claim 7 wherein said control loop includes signal comparison means having first and second inputs for receiving said reference signal and said absolute reference signal, respectively, and an output coupled to said variable energy source.

9. A yarn cleaner as claimed in claim 1 wherein said variable energy source comprises, a light source, first and second photoelectric cells arranged in said measuring channel and said reference channel, respectively, and optically coupled to said light source, and a pulse voltage source coupled to said light source.

UNITED STATES PATENT OFFICE
CERTIFICATE OF CORRECTION

Patent No. 3,582,661  Dated June 1, 1971

Inventor(s) HERMANUS STEPHANUS JOSEPHUS PIJLS

It is certified that error appears in the above-identified patent and that said Letters Patent are hereby corrected as shown below:

Col. 4, lines 49-50, cancel "and comprising furthermore";

Signed and sealed this 2nd day of November 1971.

(SEAL)
Attest:

EDWARD M. FLETCHER, JR.
Attesting Officer

ROBERT GOTTSCHALK
Acting Commissioner of Patents